(12) United States Patent
Shiramizu et al.

(10) Patent No.: US 10,612,487 B2
(45) Date of Patent: Apr. 7, 2020

(54) FUEL INJECTION CONTROL DEVICE FOR INTERNAL COMBUSTION ENGINE

(71) Applicant: YANMAR CO., LTD., Osaka-shi (JP)

(72) Inventors: Toshiki Shiramizu, Osaka (JP); Daiki Hori, Osaka (JP); Atsushi Ueta, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/122,907

(22) PCT Filed: Jan. 29, 2015

(86) PCT No.: PCT/JP2015/052525
§ 371 (c)(1),
(2) Date: Aug. 31, 2016

(87) PCT Pub. No.: WO2015/133209
PCT Pub. Date: Sep. 11, 2015

(65) Prior Publication Data
US 2017/0074199 A1 Mar. 16, 2017

(30) Foreign Application Priority Data
Mar. 5, 2014 (JP) .................................. 2014-043012

(51) Int. Cl.
*F02D 41/40* (2006.01)
*F02D 41/30* (2006.01)
(Continued)

(52) U.S. Cl.
CPC ............ *F02D 41/3005* (2013.01); *F01P 3/20* (2013.01); *F01P 11/16* (2013.01); *F02D 41/064* (2013.01);
(Continued)

(58) Field of Classification Search
CPC ...... F02D 41/3005; F02D 41/24; F02D 41/08; F02D 41/1446; F02D 41/064;
(Continued)

(56) References Cited

U.S. PATENT DOCUMENTS

| | | | |
|---|---|---|---|
| 5,642,705 | A | 7/1997 | Morikawa et al. |
| 8,096,286 | B2 | 1/2012 | Asai et al. |

(Continued)

FOREIGN PATENT DOCUMENTS

| | | | |
|---|---|---|---|
| CN | 1180785 A | 5/1998 | |
| CN | 1496442 A | 5/2004 | |

(Continued)

OTHER PUBLICATIONS

JP 10061468 A—English Translation.*
(Continued)

*Primary Examiner* — Joseph J Dallo
*Assistant Examiner* — Scott A Reinbold
(74) *Attorney, Agent, or Firm* — Norton Rose Fulbright US LLP

(57) ABSTRACT

To prevent generation of noise due to a misfire when a rotation speed is increased to an operational rotation speed immediately after low-temperature start, or is increased from an idling rotation speed in a low-temperature state to the operational rotation speed, an embodiment includes a fuel injection device capable of performing multi-stage injection of fuel accumulated in a common rail through an injector, a cooling water temperature sensor as a water temperature detection unit configured to detect a cooling water temperature of an engine, an exhaust temperature sensor as an exhaust temperature detection unit configured to detect the exhaust temperature of the engine, and an engine control unit as a control device. The control device executes a misfire avoiding mode in which the multi-stage
(Continued)

injection is continued when the cooling water temperature is not lower than a predetermined water temperature T at start of the engine.

13 Claims, 8 Drawing Sheets

(51) Int. Cl.
    *F02D 41/24* (2006.01)
    *F02D 41/14* (2006.01)
    *F02D 41/08* (2006.01)
    *F02D 41/06* (2006.01)
    *F01P 11/16* (2006.01)
    *F01P 3/20* (2006.01)

(52) U.S. Cl.
    CPC .......... *F02D 41/08* (2013.01); *F02D 41/1446* (2013.01); *F02D 41/24* (2013.01); *F02D 41/402* (2013.01); *F02D 41/403* (2013.01); *F02D 41/405* (2013.01); *F02D 2200/021* (2013.01); *F02D 2200/703* (2013.01); *Y02T 10/44* (2013.01)

(58) Field of Classification Search
    CPC .... F02D 41/402; F02D 41/403; F02D 41/405; F02D 2200/703; F02D 2200/021; F01P 11/16; F01P 3/20; Y02T 10/44
    USPC ......................................................... 701/103
    See application file for complete search history.

(56) References Cited

U.S. PATENT DOCUMENTS

| | | |
|---|---|---|
| 2002/0078681 A1 | 6/2002 | Carberry et al. |
| 2009/0038583 A1 | 2/2009 | Gwidt et al. |
| 2010/0063710 A1 | 3/2010 | Asai et al. |

FOREIGN PATENT DOCUMENTS

| | | | |
|---|---|---|---|
| CN | 101289977 A | 10/2008 | |
| DE | 102010017037 A1 | 1/2011 | |
| EP | 0838584 A2 * | 4/1998 | ............ F02B 17/005 |
| EP | 1138900 A2 | 10/2001 | |
| EP | 0838584 B1 * | 8/2004 | ............ F02B 17/005 |
| EP | 0838584 B1 * | 8/2004 | ............ F02B 17/005 |
| EP | 1444430 A1 | 8/2004 | |
| EP | 1444430 B1 | 8/2004 | |
| EP | 1728996 A1 | 12/2006 | |
| EP | 2034161 A2 | 3/2009 | |
| JP | 10061468 A * | 3/1998 | ............ F02D 41/009 |
| JP | H10-61468 A | 3/1998 | |
| JP | H11-093735 A | 4/1999 | |
| JP | 2000-154744 A | 6/2000 | |
| JP | 2001227381 A * | 8/2001 | |
| JP | 2001227381 A * | 8/2001 | |
| JP | 2001-271671 A | 10/2001 | |
| JP | 2001271671 A * | 10/2001 | ................ F02B 1/12 |
| JP | 2004-245103 A | 9/2004 | |
| JP | 2005171929 A * | 6/2005 | |
| JP | 2005171929 A * | 6/2005 | |
| JP | 2008-128016 A | 6/2008 | |
| JP | 2010-270665 A | 12/2010 | |
| KR | 10-1998-0033086 A | 7/1998 | |

OTHER PUBLICATIONS

JP 2001271671 A—English Translation.*
JP 2001227381 A—English Translation.*
JP 2005171929 A—English Translation.*
EP 0838584 B1—English Document.*
JP 2001227381 A—English Translation (Year: 2001).*
JP 2005171929 A—English Translation (Year: 2005).*
European Search Report, Application No. EP 1578839.3, dated Oct. 10, 2017, in 13 pages.
Office Action dated Nov. 21, 2018 for CN Application No. 201580011779.X.
Korean Office Action dated Jul. 10, 2019 issued in corresponding Korean Application No. 10-2016-7025892.

* cited by examiner

Crank angle

FUEL INJECTION CONTROL DEVICE FOR INTERNAL COMBUSTION ENGINE

CROSS-REFERENCE TO RELATED APPLICATIONS

This application is the U.S. National Phase under 35. U.S.C. § 371 of International Application PCT/JP2015/052525, filed Jan. 29, 2015, which claims priority to Japanese Patent Application No. 2014-043012, filed Mar. 5, 2014. The disclosures of the above-described applications are hereby incorporated by reference in their entirety.

TECHNICAL FIELD

The present invention relates to an internal-combustion fuel injection control device, and particularly relates to a fuel injection control device of a diesel engine including an accumulator (common rail) fuel injection device capable of performing multi-stage injection.

BACKGROUND ART

Conventionally, an accumulator fuel injection mechanism capable of performing multi-stage injection has been employed to simultaneously achieve reduction in PM (particulate matter), NOx (nitrogen oxide), and noise, for example. As publicly known, in an engine including such an accumulator fuel injection device capable of performing multi-stage injection, a pre-injection performed ahead of a main injection achieves stable combustion in a low-load state in which a load on the engine is relatively low (refer to Patent Document 1).

PRIOR ART DOCUMENT

Patent Document

PTL1: JP H11-93735 A

SUMMARY OF INVENTION

Problem to be Solved by the Invention

In order to achieve low fuel consumption, a recent work machine is provided with a function to automatically stop its engine when an operation of the work machine is continuously paused. The engine of the work machine having this function stops when the work machine is continuously not operational for a certain time. Thereafter, when the engine is started at start of an operation and the rotation speed of the engine is increased to an operational rotation speed, unstable combustion potentially occurs depending on a use condition of the engine, which may cause rotation fluctuation and encumber workability. This phenomenon is likely to improve when the engine becomes warmed up as the operation continues.

The inventors have studied the phenomenon described above and found a condition on which the operation at a water temperature not lower than a cooling water temperature T causes the above-described unstable combustion, as illustrated in FIG. 7, when the rotation speed of the engine is increased to the operational rotation speed at restart of the engine or after being left in an idling operation. The present invention employs a solution as follows based on this finding.

Solutions to the Problems

The above describes a problem to be solved by the present invention, whereas the following describes a solution to this problem.

An aspect of the present invention includes a fuel injection device capable of performing multi-stage injection of fuel accumulated in a common rail through an injector, a water temperature detection unit configured to detect a cooling water temperature of an engine, an exhaust temperature detection unit configured to detect an exhaust temperature of the engine, and a control device. The control device executes a misfire avoiding mode in which the multi-stage injection is continued when the cooling water temperature is not lower than T at start of the engine.

According to the present invention, the misfire avoiding mode is deactivated in a first set time after the exhaust temperature becomes not lower than a first set temperature.

According to the present invention, the control device actuates a timer when the exhaust temperature becomes lower than a second set temperature lower than the first set temperature after having become not lower than the first set temperature. The control device activates the misfire avoiding mode when the timer has passed a second set time.

According to a fourth aspect, the control device is connected with an atmospheric pressure sensor, stores an atmospheric pressure correction coefficient, and corrects the first set time in accordance with an atmospheric pressure through a correction unit.

Effect of the Invention

The present invention achieves an effect as follows.

The present invention can prevent generation of unstable combustion when a rotation speed is increased to an operational rotation speed right after an engine of a work machine is restarted following a pause of an operation with the work machine (stop of the engine), or when the rotation speed is increased to the operational rotation speed from an idling rotation speed in a long time. The present invention thus can prevent, for example, rotation speed fluctuation and degradation of workability due to the unstable combustion.

EMBODIMENTS OF THE INVENTION

Figure 1:
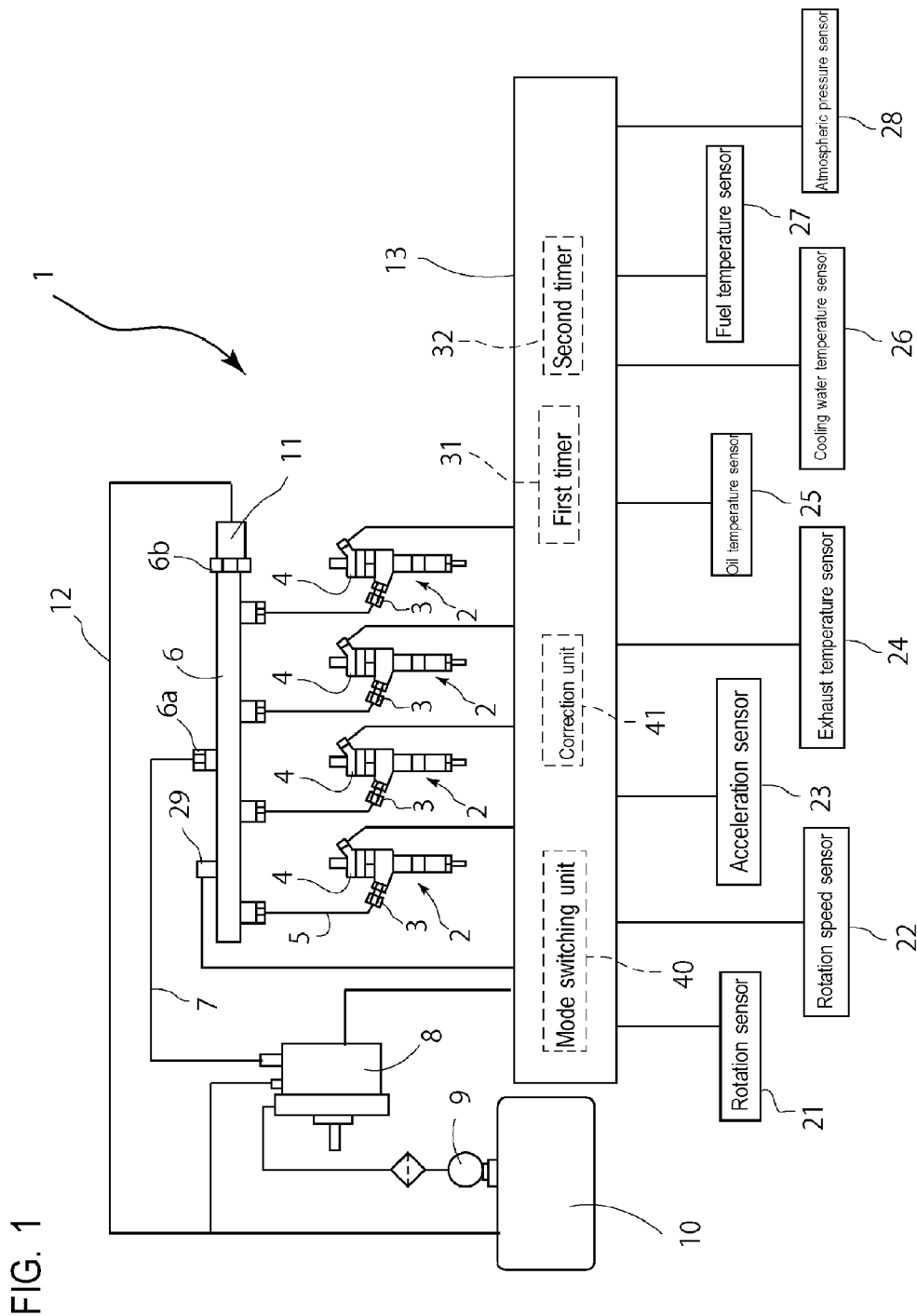
FIG. 1 schematically illustrates an internal combustion to which the present invention is applied.

In FIG. 1, an engine 1 is a multicylinder internal combustion, and is a four-cylinder diesel engine in the present embodiment. Each cylinder of the engine 1 is provided with an injector 2 for fuel injection. A nozzle at the head of the injector 2 is inserted into a combustion room, and a fuel inlet 3 and an electromagnetic valve (solenoid) 4 are provided at the other end of the injector 2. The fuel inlet 3 is connected with a common rail (accumulator pipe) 6 through a high pressure pipe 5. The common rail 6 is provided with a fuel inlet 6a and a return outlet 6b. The fuel inlet 6a is connected with a supply pump 8 through a fuel supply pipe 7, and an intake of the supply pump 8 is connected with a fuel tank 10 through a feed pump 9. The return outlet 6b of the common rail 6 is connected with the fuel tank 10 through an overflow valve 11 and a surplus pipe 12. The surplus pipe 12 is connected with a surplus outlet (not illustrated) of each injector 2 and a surplus outlet of the supply pump 8.

The electromagnetic valve 4 of each injector 2 is electrically connected with an engine control unit (control device, ECU) 13. In response to open and close instruction signals from the engine control unit 13, the electromagnetic valve 4 is configured to open and close the injector 2 at predetermined open and close timings so as to inject fuel under high pressure into the cylinder.

The engine control unit 13 is electrically connected with, for example, a rotation sensor 21 configured to determine a cylinder provided to a camshaft or a crankshaft, a rotation speed sensor 22, an acceleration sensor 23, an exhaust temperature sensor 24, an oil temperature sensor 25, a cooling water temperature sensor 26, and a fuel temperature sensor 27, so as to detect the state of the engine 1. A pressure sensor 29 for detecting rail pressure (accumulation pressure) is provided near the fuel inlet 6a of the common rail 6, and electrically connected with the engine control unit 13.

Figure 8:
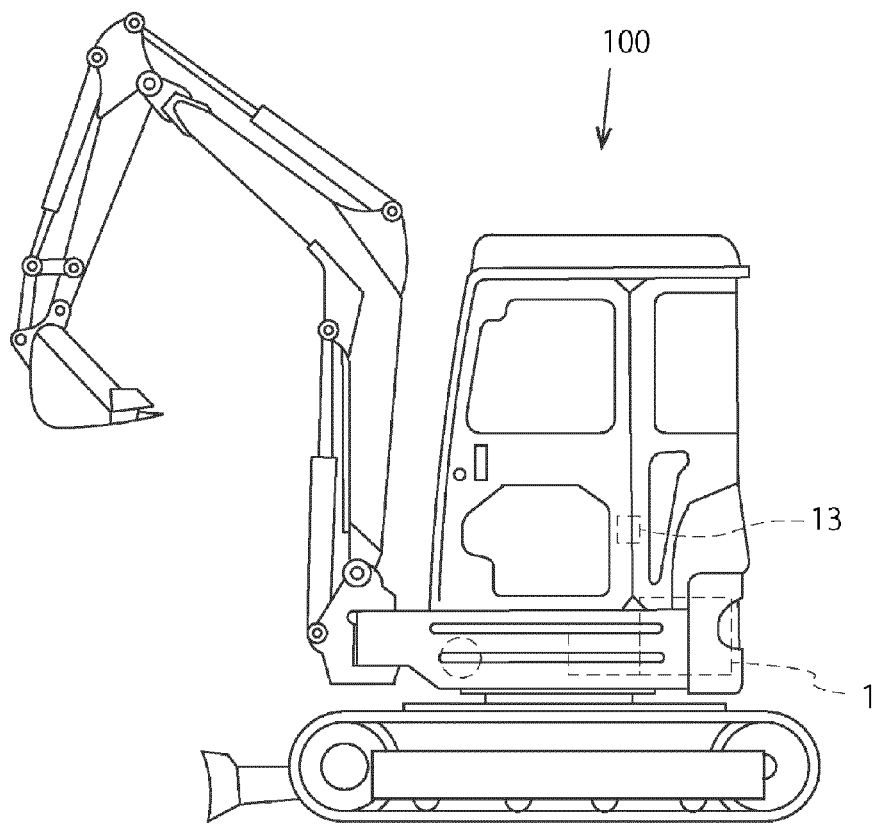
FIG. 8 is a side view of an excavation work machine on which an internal-combustion fuel injection control device according to the present invention is mounted.

The engine control unit 13 includes a CPU configured to execute various kinds of arithmetic processing and a control program, a ROM as a storage device configured to store, for example, various programs and maps, a RAM configured to temporarily store various programs and data, a timer, and an input and output interface. The engine 1 and the engine control unit 13 are mounted on an excavation work machine 100 illustrated in FIG. 8.

Figure 7:
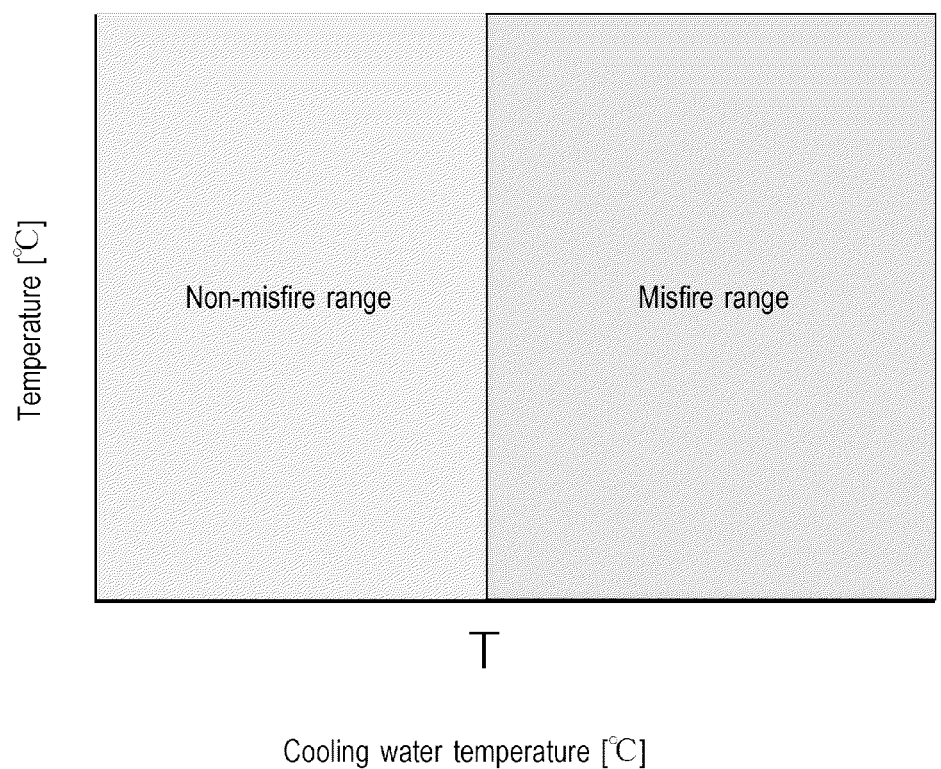
FIG. 7 illustrates a relation between a temperature and generation of misfire.

The engine control unit 13 performs control to open and close the electromagnetic valve 4 of the injector 2. Conventionally, multi-stage injection has been performed in the entire operational range at a cooling water temperature lower than T so as to achieve starting performance and combustion stability of the engine. When a cooling water temperature becomes not lower than T as the engine is continuously operated and warmed up, a switch is made to such an injection map that single-stage injection is performed in a certain operational range so as to obtain sufficient engine performance and emission performance. However, as illustrated in FIG. 7, even at the cooling water temperature not lower than T, the engine suffers unstable combustion depending on its use condition until the engine is completely warmed up, which causes rotation fluctuation and degradation of workability. In this manner, the combustion is likely to be in an unstable state if a switch is made to the injection map including single-stage injection at the cooling water temperature T. Thus, an operation mode switching unit is provided and configured to continue, as a misfire avoiding mode, the multi-stage injection in this operational range without switching the entire-range multi-stage injection to the injection map including single-stage injection, under a condition likely to cause unstable combustion even at a cooling water temperature exceeding T. Once a condition allowing a stable operation of the engine has been established, a switch is made to the injection map including single-stage injection as a normal operation mode, thereby achieving combustion stability of the engine, reduced exhaust gas emission, and improved engine performance.

Figure 6:
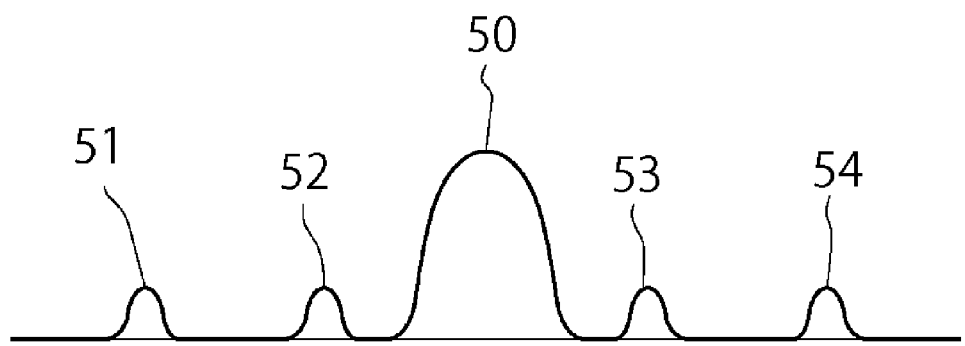
FIG. 6 illustrates multi-stage injection.

The multi-stage injection requires two injections or more in each combustion cycle. For example, when the multi-stage injection includes five injections in each combustion cycle as illustrated in FIG. 6, a pilot injection 51 is injected at a largely advanced timing with respect to a main injection 50 so as to achieve reduction in PM by premixing combustion and reduction in combustion noise. A pre-injection 52 is performed before the main injection 50 so as to achieve reduction in NOx and in combustion noise. An after-injection 53 is performed at a timing close to the main injection 50, intensifying diffusive combustion to achieve reduction in PM. A post-injection 54 is performed at a largely retarded timing with respect to the main injection 50, rising an exhaust gas temperature to activate a catalyst of an exhaust gas filter. This multi-stage injection is performed to achieve reduction in PM, NOx, and noise. The number of stages of the multi-stage injection may be any number equal to or larger than two.

The following describes switching of the misfire avoiding mode according to the present invention.

The engine control unit 13 includes a mode switching unit 40. The mode switching unit 40 is configured to perform transition to modes when the following conditions are met.

Figure 2:
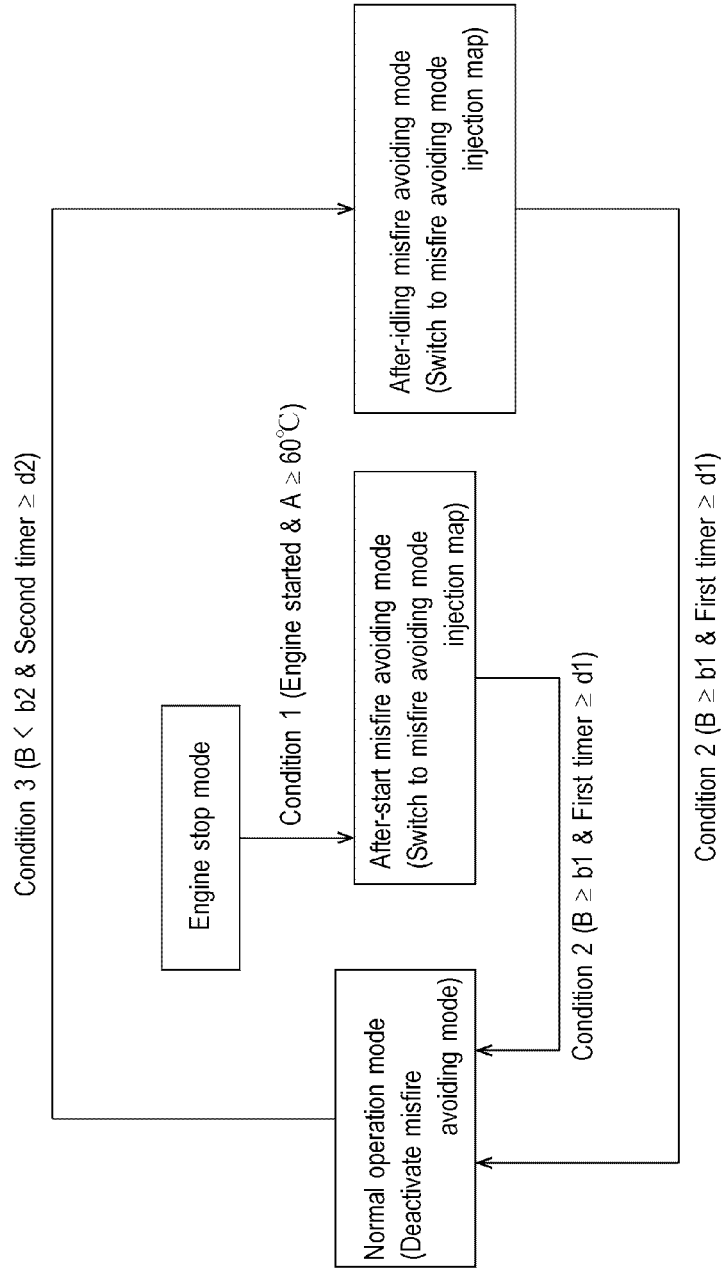
FIG. 2 illustrates a switching condition of a control mode.

In FIG. 2, in an engine stop mode, fuel is not injected from the injector 2, and the crankshaft is not rotating. When a starter is actuated through a key operation and cranking is performed, fuel is transferred to the common rail 6 from the feed pump 9 and the supply pump 8. Having reached at a predetermined fuel pressure, the fuel is injected from the injector 2 at a predetermined timing to start the engine 1. In addition, when the cooling water temperature is not lower than a predetermined water temperature T, transition condition 1 is met and the mode switching unit 40 performs transition to an after-start misfire avoiding mode. In the after-start misfire avoiding mode, an injection timing is read from a misfire avoiding mode injection map stored in the storage device (ROM) of the engine control unit 13, and injection of the injector 2 is controlled accordingly.

In the after-start misfire avoiding mode, when exhaust temperature B becomes not lower than first set temperature b1 and a first timer 31 included in the engine control unit 13 passes effective time d1, transition condition 2 is met and the mode switching unit 40 performs transition to the normal operation mode. The misfire avoiding mode is deactivated in the normal operation mode, so that the injection timing is not read from the misfire avoiding mode injection map, and the injection is controlled at an injection timing of a normal operation.

In the normal operation mode, when exhaust temperature B becomes lower than second set temperature b2 and a second timer 32 included in the engine control unit 13 passes effective time d2, transition condition 3 is met and the mode switching unit 40 performs transition to an after-idling misfire avoiding mode. In the after-idling misfire avoiding mode, an injection timing is read from the misfire avoiding mode injection map, and the injection of the injector 2 is controlled accordingly.

When transition condition 2 is met in the after-idling misfire avoiding mode, the mode switching unit 40 performs transition to the normal operation mode.

This control is described in detail below with reference to flowcharts in FIGS. 3 to 5.

Figure 3:
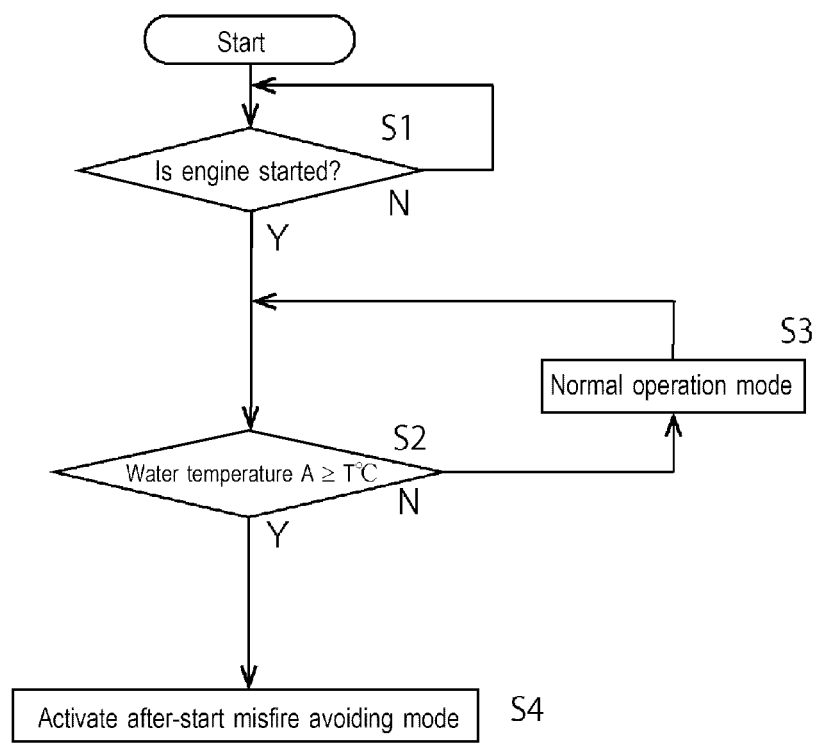
FIG. 3 illustrates a control flowchart of condition 1.

As illustrated in FIG. 3, when the engine 1 is started (S1), engine cooling water temperature A is acquired from the cooling water temperature sensor 26. Engine cooling water temperature A is compared to the predetermined water temperature T as a shift boundary temperature (S2). The normal operation mode is activated (S3) at a low temperature lower than the predetermined water temperature T, and the engine 1 is operated in a similar manner to the conventional operation. If engine cooling water temperature A is not lower than the predetermined water temperature T (transition condition 1 is met), the after-start misfire avoiding mode is activated (S4) and a switch is made to an injection map in the misfire avoiding mode.

Figure 4:
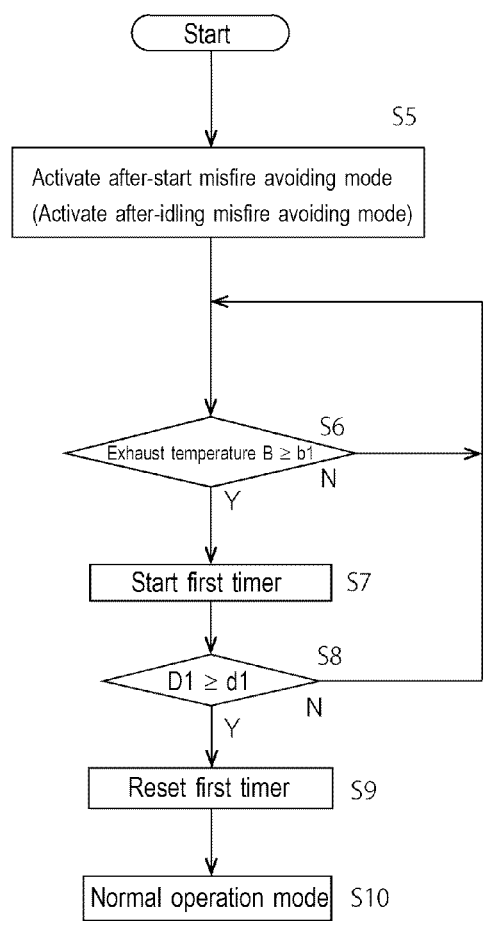
FIG. 4 illustrates a control flowchart of condition 2.

Then, as illustrated in FIG. 4, the engine is continuously operated while the misfire avoiding mode is activated (S5), so that the temperature of the engine increases. Then, it is determined whether exhaust temperature B detected by the exhaust temperature sensor 24 is higher than first set temperature b1 at which it is determined that the engine is warmed up (S6). The operation is continued if exhaust temperature B is lower than first set temperature b1, or the first timer 31 is started if exhaust temperature B exceeds first set temperature b1 (S7). When started, the first timer 31 counts first timer count time D1, and then it is determined whether first timer count time D1 has passed first set time d1 (S8). Having been operated in first set time d1, the engine 1 is sufficiently warmed up.

If first timer count time D1 has passed first set time d1 (transition condition 2 is met), the first timer 31 is reset (S9), and the misfire avoiding mode is deactivated. Thus, the engine is in a warmed-up state when first set time d1 has passed, and the normal operation mode is activated accordingly (S10).

Figure 5:
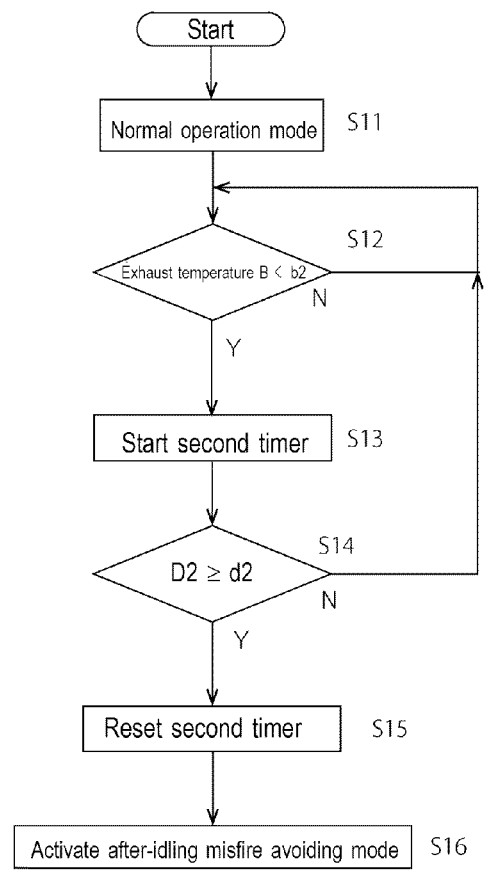
FIG. 5 illustrates a control flowchart of condition 3.

As illustrated in FIG. 5, if the engine is in the normal operation mode (S11), exhaust temperature B is compared to second set temperature b2 (S12). If exhaust temperature B is lower than second set temperature b2, the second timer 32 is started (S13). Second set temperature b2 is lower than first set temperature b1 (b1>b2) and is a temperature at which a misfire is likely to occur. It is determined whether second timer count time D2 has passed second set time d2 (S14). If second timer count time D2 has passed second set time d2 (transition condition 3 is met), the second timer 32 is reset (S15), and the after-idling misfire avoiding mode is activated (S16). Accordingly, a switch is made to the misfire avoiding mode injection map, and the above-described control is repeated.

Specifically, when the rotation speed of the engine is increased immediately after the engine is started, and then is reduced in a short operational time, a misfire is likely to occur because the engine is not sufficiently warmed up yet. In order to avoid this misfire, the misfire avoiding mode is activated.

As described above, the present embodiment includes a fuel injection device capable of performing multi-stage injection of fuel accumulated in the common rail 6 through the injector 2, the cooling water temperature sensor 26 serving as a water temperature detection unit configured to detect the temperature of cooling water of the engine 1, the exhaust temperature sensor 24 serving as an exhaust temperature detection unit configured to detect the exhaust temperature of the engine 1, and the engine control unit 13 serving as a control device. The engine control unit 13 as the control device executes the misfire avoiding mode in which the multi-stage injection is continued when the cooling water temperature is not lower than the predetermined water temperature T at start of the engine. Accordingly, when the rotation speed is increased to an operational rotation speed right after low-temperature start, no misfire occurs, thereby preventing generation of noise.

The misfire avoiding mode is deactivated in first set time d1 after exhaust temperature B becomes not lower than first set temperature b1. Thus, the control is returned to the normal operation mode after the engine 1 is warmed up, which prevents degradation of the efficiency of the combustion otherwise caused by continuation of the misfire avoiding mode.

The engine control unit 13 actuates the second timer 32 when exhaust temperature B becomes lower than second set temperature b2 lower than first set temperature b1 after having become not lower than first set temperature b1. Then, the engine control unit 13 activates the misfire avoiding mode when the second timer 32 has passed second set time d2. Thus, when the rotation speed is increased from an idling rotation speed in a low-temperature state to an operational rotation speed, no misfire occurs, thereby preventing generation of noise.

The atmospheric pressure is low at highland, so that the amount of oxygen to be introduced into the engine is low. To achieve a stable combustion state (prevent a misfire), the operation mode of the engine needs to be managed more precisely than at flatland. For this purpose, an atmospheric pressure sensor 28 is connected with the engine control unit 13, a correction unit 41 is provided to the engine control unit 13, and an atmospheric pressure correction coefficient for correcting first set time d1 in accordance with the atmospheric pressure is stored in the storage device in advance. Then, the atmospheric pressure is detected by the atmospheric pressure sensor 28, and first set time d1 is changed by the correction unit 41 in accordance with the detected atmospheric pressure. For example, when used in highland at a high altitude, the engine takes a longer time to warm up due to a low atmospheric pressure, and thus first set time d1 is set to be longer. An atmospheric pressure correction map may be used in place of the atmospheric pressure correction coefficient.

As described above, the engine control unit 13 as the control device is connected with the atmospheric pressure sensor 28, stores the atmospheric pressure correction coefficient, and corrects first set time d1 in accordance with the atmospheric pressure through the correction unit 41. With this configuration, the misfire avoiding mode effectively acts to prevent a misfire and reduce noise even when the engine is used at a place such as highland where the atmospheric pressure is low.

INDUSTRIAL APPLICABILITY

The present invention is applicable to, for example, a construction machine and a farm vehicle on which a diesel engine including an accumulator fuel injection device capable of performing multi-stage injection is mounted to be driven.

DESCRIPTION OF REFERENCE SIGNS

1: Engine
2: Injector
6: Common rail
13: Engine control unit (control device)
24: Exhaust temperature sensor
26: Cooling water temperature sensor
28: Atmospheric pressure sensor

What is claimed is:
1. An internal-combustion fuel injection control device comprising:
a valve configured to perform multi-stage injection of fuel accumulated in a common rail through an injector;

a first temperature sensor configured to detect a cooling water temperature of an engine;

a second temperature sensor configured to detect an exhaust temperature of the engine; and a control device comprising a central processing unit (CPU) and memory, the control device is configured to:

activate a misfire avoiding mode associated with the multi-stage injection based on the cooling water temperature being greater than or equal to a predetermined water temperature after start of the engine;

after the exhaust temperature is greater than or equal to a first set temperature for at least a first time period, deactivate the misfire avoiding mode to switch to a normal operation mode associated with single-stage injection;

when in the normal operation mode and after the exhaust temperature is less than a second set temperature, actuate a timer associated with a second time period, the second set temperature less than the first set temperature; and activate the misfire avoiding mode after a lapse of the second time period based on the timer.

2. An internal-combustion fuel injection control device comprising:

a valve configured to perform multi-stage injection of fuel accumulated in a common rail through an injector;

a first temperature sensor configured to detect a cooling water temperature of an engine;

a second temperature sensor configured to detect an exhaust temperature of the engine;

an atmospheric pressure sensor configured to detect an atmospheric pressure; and a control device coupled to the atmospheric pressure sensor and comprising a central processing unit (CPU) and memory configured to store an atmospheric correction map, the control device configured to:

activate a misfire avoiding mode associated with the multi-stage injection based on the cooling water temperature being greater than or equal to a predetermined water temperature after start of the engine;

determine a first time period based on the atmospheric pressure and the atmospheric correction map; and after the exhaust temperature is greater than or equal to a first set temperature for at least the first time period, deactivate the misfire avoiding mode to switch to a normal operation mode associated with single-stage injection.

3. A system comprising a control device comprising a central processing unit (CPU) and memory is configured to:

activate a misfire avoiding mode associated with multi-stage injection based on a cooling water temperature associated with an engine being greater than or equal to a predetermined water temperature after start of the engine;

in response to an exhaust temperature associated with the engine being greater than or equal to a first set temperature, actuate a first timer associated with a first time period;

after a lapse of at least the first time period, deactivate the misfire avoiding mode to switch to a normal operation mode associated with single-stage injection; and when in the normal operation mode and after the exhaust temperature is less than a second set temperature, actuate a second time associated with a second time period.

4. The system of claim 3, wherein the second set temperature less than the first set temperature.

5. The system of claim 3, wherein the control device is further configured to activate the misfire avoiding mode after a lapse of the second time period based on the second timer.

6. The system of claim 3, wherein the control device is further configured to determine a duration of the first time period based on an atmospheric pressure.

7. The system of claim 6, wherein the memory is configured to store an atmospheric correction map.

8. The system of claim 7, wherein the control device is further configured to determine the duration of the first time period based on the atmospheric correction map.

9. The system of claim 3, further comprising the engine.

10. The system of claim 3, further comprising:

an injector; and a valve configured to perform the multi-stage injection of fuel accumulated in a common rail through the injector.

11. The system of claim 3, further comprising:

a first temperature sensor configured to detect the cooling water temperature.

12. The system of claim 11, further comprising:

a second temperature sensor configured to detect an exhaust temperature associated with the engine.

13. The system of claim 3, further comprising an atmospheric pressure sensor configured to detect an atmospheric pressure.

* * * * *